United States Patent
Wang et al.

(10) Patent No.: US 10,342,031 B2
(45) Date of Patent: Jul. 2, 2019

(54) DATA TRANSMISSION METHOD AND DEVICE

(71) Applicant: HUAWEI TECHNOLOGIES CO., LTD., Shenzhen, Guangdong (CN)

(72) Inventors: Da Wang, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 11 days.

(21) Appl. No.: 15/524,760

(22) PCT Filed: Nov. 7, 2014

(86) PCT No.: PCT/CN2014/090579
§ 371 (c)(1),
(2) Date: May 5, 2017

(87) PCT Pub. No.: WO2016/070407
PCT Pub. Date: May 12, 2016

(65) Prior Publication Data
US 2017/0325253 A1 Nov. 9, 2017

(51) Int. Cl.
*H04W 72/00* (2009.01)
*H04W 72/12* (2009.01)
(Continued)

(52) U.S. Cl.
CPC ......... *H04W 72/1252* (2013.01); *H04L 5/001* (2013.01); *H04L 27/04* (2013.01);
(Continued)

(58) Field of Classification Search
CPC .......... H04W 72/1252; H04W 72/0446; H04L 27/06; H04L 27/04; H04L 5/0007; H04L 27/08; H04L 25/4902
See application file for complete search history.

(56) References Cited

U.S. PATENT DOCUMENTS

| 7,623,494 B2 | 11/2009 | Zhu et al. |
| 2012/0195213 A1* | 8/2012 | Tan ............ H04L 5/0053 370/252 |

(Continued)

FOREIGN PATENT DOCUMENTS

| CN | 101998497 A | 3/2011 |
| CN | 102281595 A | 12/2011 |
| CN | 104094665 A | 10/2014 |

OTHER PUBLICATIONS

International Search Report, dated Aug. 5, 2015, in International Application No. PCT/CN2014/090579 (5 pp.).
(Continued)

*Primary Examiner* — Lakeram Jangbahadur
(74) *Attorney, Agent, or Firm* — Staas & Halsey LLP

(57) ABSTRACT

A data transmission method and a device are disclosed and relate to the field of communications technologies, so that a channel resource preemption probability of a device can be effectively increased by reducing a CCA interval at which a CCA is performed on a channel resource. The method includes: determining, by a first device, a CCA start moment at which a clear channel assessment CCA is performed; determining, by the first device, a CCA interval, where the CCA interval is a time interval between two adjacent CCAs, and a time interval between any two adjacent CCAs is less than a preconfigured data frame period; performing, by the first device, a CCA process according to the CCA start moment and the CCA interval; and sending, by the first device, data at an end moment of the CCA process. The method and the device are used for data transmission.

17 Claims, 5 Drawing Sheets

(51) Int. Cl.
  *H04L 27/04* (2006.01)
  *H04L 27/06* (2006.01)
  *H04L 5/00* (2006.01)
  *H04W 74/08* (2009.01)
  *H04L 25/49* (2006.01)
  *H04L 27/08* (2006.01)
  *H04W 72/04* (2009.01)
  *H04L 27/26* (2006.01)

(52) U.S. Cl.
  CPC ......... *H04L 27/06* (2013.01); *H04W 74/0808* (2013.01); *H04L 5/0007* (2013.01); *H04L 25/4902* (2013.01); *H04L 27/08* (2013.01); *H04L 27/2602* (2013.01); *H04W 72/0446* (2013.01)

(56) References Cited

U.S. PATENT DOCUMENTS

2015/0009878 A1* 1/2015 Kim .................. H04W 4/70
                                                    370/311
2016/0105888 A1* 4/2016 Seok .................. H04W 16/10
                                                    370/329

OTHER PUBLICATIONS

International Search Report dated Aug. 5, 2015 in corresponding International Patent Application No. PCT/CN2014/090579.

\* cited by examiner

DATA TRANSMISSION METHOD AND DEVICE

CROSS REFERENCE TO RELATED APPLICATIONS

This application is a national stage of International Application No. PCT/CN2014/090579, filed on Nov. 7, 2014, which is hereby incorporated by reference in its entirety.

TECHNICAL FIELD

Embodiments of the present invention relate to the communications field, and more specifically, to a data transmission method and a device.

BACKGROUND

In a licensed-assisted access using Long Term Evolution (Licensed-Assisted Access Using Long Term Evolution, "LAA-LTE" for short) system, a device uses a channel resource according to a listen before talk (Listen Before Talk, "LBT" for short) rule. LBT is a carrier sense multiple access (Carrier Sense Multiple Access, "CSMA" for short) technology, and operation modes of the LBT technology include a load based equipment (Load Based Equipment, "LBE" for short) operation mode and a frame based equipment (Frame Based Equipment, "FBE" for short) operation mode.

In the LAA-LTE system, a device uses a clear channel assessment (Clear Channel Assessment, "CCA" for short) to detect a channel resource. When it is determined that the channel resource is occupied, the device backs off for one data frame period, and then performs a CCA again. The device occupies a channel resource to send data when it is determined that the channel resource is idle. When the existing device needs to use a channel resource, the existing device has a relatively low channel resource occupancy probability.

SUMMARY

Embodiments of the present invention provide a data transmission method and a device, to resolve a problem that a channel resource occupancy probability of a device is relatively low.

According to a first aspect, a data transmission method is provided, where the method includes:

determining, by a first device, a CCA start moment at which a clear channel assessment CCA is performed;

determining, by the first device, a CCA interval, where the CCA interval is a time interval between two adjacent CCAs, and a time interval between any two adjacent CCAs is less than a preconfigured data frame period;

performing, by the first device, a CCA process according to the CCA start moment and the CCA interval; and sending, by the first device, data at an end moment of the CCA process.

With reference to the first aspect, in a first possible implementation manner of the first aspect, the determining, by the first device, a CCA interval includes:

determining, by the first device, that the time interval between two adjacent CCAs is L first time lengths, where L is a positive integer.

With reference to the first possible implementation manner of the first aspect, in a second possible implementation manner of the first aspect, the first time length is any one of the following time length information: a subframe time length, 1/K of a subframe time length, a timeslot time length, an orthogonal frequency division multiplexing OFDM symbol time length, 1/K of an OFDM symbol time length, or a sampling-interval time length, where K is a positive integer.

With reference to the first aspect or the first possible implementation manner of the first aspect, in a third possible implementation manner of the first aspect, the determining, by the first device, that the time interval between two adjacent CCAs is L first time lengths includes:

when the data frame period is 5 ms, determining, by the first device, that the time interval between two adjacent CCAs is 0.04 ms; or when the data frame period is 10 ms, determining, by the first device, that the time interval between two adjacent CCAs is 0.24 ms.

With reference to the first aspect, in a fourth possible implementation manner of the first aspect, the determining, by the first device, a CCA interval includes:

determining, by the first device, that the time interval between two adjacent CCAs is a time length of one CCA.

With reference to the first aspect, in a fifth possible implementation manner of the first aspect, the determining, by the first device, a CCA interval includes:

determining, by the first device, a time interval between every two adjacent CCAs, where the time intervals are the same or different.

With reference to any one of the first aspect or the first to the fifth possible implementation manners of the first aspect, in a sixth possible implementation manner of the first aspect, the determining, by a first device, a CCA start moment at which a clear channel assessment CCA is performed includes:

determining, by the first device, an end moment of a $Q^{th}$ second time length that is after an end moment of data transmission performed by the first device by occupying a channel resource, as the CCA start moment, where Q is zero or a positive integer.

With reference to the sixth possible implementation manner of the first aspect, in a seventh possible implementation manner of the first aspect, a sum of the Q second time lengths is not greater than the data frame period.

With reference to any one of the first aspect or the first to the seventh possible implementation manners of the first aspect, in an eighth possible implementation manner of the first aspect, the performing, by the first device, a CCA process according to the CCA start moment and the CCA interval includes:

performing, by the first device, the CCA process according to the CCA start moment, the CCA interval, and an initial backoff value $N_0$, where the CCA process is a CCA backoff process, and $N_0$ is a positive integer.

With reference to any one of the first aspect or the first to the eighth possible implementation manners of the first aspect, in a ninth possible implementation manner of the first aspect, the CCA start moment is any one of the following moments: a start moment of an OFDM symbol, a moment that corresponds to each 1/K of an OFDM symbol, a start moment of a timeslot, a start moment of a subframe, a start moment of a data frame, or a start moment of M sampling intervals, where K and M are positive integers.

With reference to any one of the first aspect or the first to the ninth possible implementation manners of the first aspect, in a tenth possible implementation manner of the first aspect, the first device is a base station or user equipment.

According to a second aspect, a first device is provided, where the first device includes:

a first determining module, configured to determine a CCA start moment at which a clear channel assessment CCA is performed;

a second determining module, configured to determine a CCA interval, where the CCA interval is a time interval between two adjacent CCAs, and a time interval between any two adjacent CCAs is less than a preconfigured data frame period;

a clear channel assessment module, configured to perform a CCA process according to the CCA start moment determined by the first determining module and the CCA interval determined by the second determining module; and a sending module, configured to send data at an end moment of the CCA process of the clear channel assessment module.

With reference to the second aspect, in a first possible implementation manner of the second aspect, the second determining module is specifically configured to determine that the time interval between two adjacent CCAs is L first time lengths, where L is a positive integer.

With reference to the first possible implementation manner of the second aspect, in a second possible implementation manner of the second aspect, the first time length is any one of the following time length information: a subframe time length, 1/K of a subframe time length, a timeslot time length, an orthogonal frequency division multiplexing OFDM symbol time length, 1/K of an OFDM symbol time length, or a sampling-interval time length, where K is a positive integer.

With reference to the second aspect or the first possible implementation manner of the second aspect, in a third possible implementation manner of the second aspect, the second determining module is specifically configured to: when the data frame period is 5 ms, determine that the time interval between two adjacent CCAs is 0.04 ms; or the second determining module is specifically configured to: when the data frame period is 10 ms, determine that the time interval between two adjacent CCAs is 0.24 ms.

With reference to the second aspect, in a fourth possible implementation manner of the second aspect, the second determining module is specifically configured to determine that the time interval between two adjacent CCAs is a time length of one CCA.

With reference to the second aspect, in a fifth possible implementation manner of the second aspect, the second determining module is specifically configured to determine a time interval between every two adjacent CCAs, where the time intervals are the same or different.

With reference to any one of the second aspect or the first to the fifth possible implementation manners of the second aspect, in a sixth possible implementation manner of the second aspect, the first determining module is specifically configured to determine an end moment of a $Q^{th}$ second time length that is after an end moment of data transmission as the CCA start moment, where Q is zero or a positive integer.

With reference to the sixth possible implementation manner of the second aspect, in a seventh possible implementation manner of the second aspect, a sum of the Q second time lengths is not greater than the preconfigured data frame period.

With reference to any one of the second aspect or the first to the seventh possible implementation manners of the second aspect, in an eighth possible implementation manner of the second aspect, the clear channel assessment module is specifically configured to perform the CCA process according to the CCA start moment, the CCA interval, and an initial backoff value $N_0$, where the CCA process is a CCA backoff process, and $N_0$ is a positive integer.

With reference to any one of the second aspect or the first to the eighth possible implementation manners of the second aspect, in a ninth possible implementation manner of the second aspect, the CCA start moment is any one of the following moments: a start moment of an OFDM symbol, a moment that corresponds to each 1/K of an OFDM symbol, a start moment of a timeslot, a start moment of a subframe, a start moment of a data frame, or a start moment of M sampling intervals, where K and M are positive integers.

With reference to any one of the second aspect or the first to the ninth possible implementation manners of the second aspect, in a tenth possible implementation manner of the second aspect, the first device is a base station or user equipment.

According to a third aspect, a first device is provided, where the first device includes:

a memory, configured to store an instruction;

a transmitter, configured to send data; and a processor, configured to execute the instruction stored in the memory, to control the transmitter to send the data;

where the processor is specifically configured to:

determine a CCA start moment at which a clear channel assessment CCA is performed;

determine a CCA interval, where the CCA interval is a time interval between two adjacent CCAs, and a time interval between any two adjacent CCAs is less than a preconfigured data frame period; and perform a CCA process according to the CCA start moment and the CCA interval; and the transmitter is specifically configured to send the data at an end moment of the CCA process.

With reference to the third aspect, in a first possible implementation manner of the third aspect, the processor is specifically configured to determine that the time interval between two adjacent CCAs is L first time lengths, where L is a positive integer.

With reference to the first possible implementation manner of the third aspect, in a second possible implementation manner of the third aspect, the first time length is any one of the following time length information: a subframe time length, 1/K of a subframe time length, a timeslot time length, an orthogonal frequency division multiplexing OFDM symbol time length, 1/K of an OFDM symbol time length, or a sampling-interval time length, where K is a positive integer.

With reference to the third aspect or the first possible implementation manner of the third aspect, in a third possible implementation manner of the third aspect, the processor is specifically configured to: when the data frame period is 5 ms, determine that the time interval between two adjacent CCAs is 0.04 ms; or the processor is specifically configured to: when the data frame period is 10 ms, determine that the time interval between two adjacent CCAs is 0.24 ms.

With reference to the third aspect, in a fourth possible implementation manner of the third aspect, the processor is specifically configured to determine that the time interval between two adjacent CCAs is a time length of one CCA.

With reference to the third aspect, in a fifth possible implementation manner of the third aspect, the processor is specifically configured to determine a time interval between every two adjacent CCAs, where the time intervals are the same or different.

With reference to any one of the third aspect or the first to the fifth possible implementation manners of the third aspect, in a sixth possible implementation manner of the third aspect, the processor is specifically configured to determine an end moment of a $Q^{th}$ second time length that is after an end moment of data transmission as the CCA start moment, where Q is zero or a positive integer.

With reference to the sixth possible implementation manner of the third aspect, in a seventh possible implementation manner of the third aspect, a sum of the Q second time lengths is not greater than the preconfigured data frame period.

With reference to any one of the third aspect or the first to the seventh possible implementation manners of the third aspect, in an eighth possible implementation manner of the third aspect, the processor is specifically configured to perform the CCA process according to the CCA start moment, the CCA interval, and an initial backoff value $N_0$, where the CCA process is a CCA backoff process, and $N_0$ is a positive integer.

With reference to any one of the third aspect or the first to the eighth possible implementation manners of the third aspect, in a ninth possible implementation manner of the third aspect, the CCA start moment is any one of the following moments: a start moment of an OFDM symbol, a moment that corresponds to each 1/K of an OFDM symbol, a start moment of a timeslot, a start moment of a subframe, a start moment of a data frame, or a start moment of M sampling intervals, where K and M are positive integers.

With reference to any one of the third aspect or the first to the ninth possible implementation manners of the third aspect, in a tenth possible implementation manner of the third aspect, the first device is a base station or user equipment.

Based on the foregoing technical solutions, according to the data transmission method and the device that are provided in the embodiments of the present invention, a channel resource occupancy probability of a device can be effectively increased by reducing a CCA interval at which a clear channel assessment (CCA) is performed on a channel resource.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
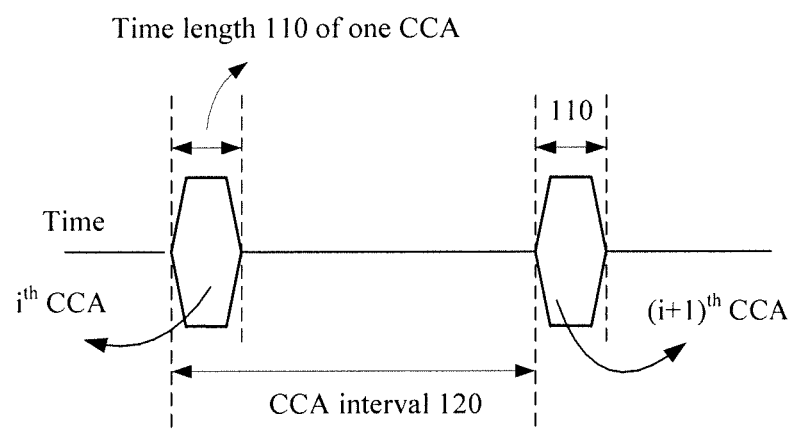
FIG. 1 is a schematic diagram of a clear channel assessment (CCA)

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A device involved in the embodiments of the present invention may be a device in a licensed-assisted access using Long Term Evolution (Licensed-Assisted Access Using Long Term Evolution, "LAA-LTE" for short) system or may be a device in another system. This is not limited in the embodiments of the present invention.

It should be understood that, the licensed-assisted access using Long Term Evolution (LAA-LTE) system may also be referred to as a Long Term Evolution in unlicensed spectrum (Long Term Evolution Unlicensed spectrum, "LTE-U" for short) system.

Optionally, the device involved in the embodiments of the present invention may be user equipment or may be a network side device. This is not limited in the embodiments of the present invention.

The user equipment (User Equipment, "UE" for short) may also be referred to as a terminal device, a mobile station (Mobile Station, "MS" for short), a mobile terminal (Mobile Terminal), or the like. The terminal device may communicate with one or more core networks by using a radio access network (Radio Access Network, RAN). For example, the terminal device may be a mobile phone (or referred to as a "cellular" phone) or a computer with a mobile terminal. For example, the terminal device may also be a portable, pocket-sized, handheld, computer built-in, or in-vehicle mobile apparatus, which can exchange voices and/or data with the radio access network. The network side device may be a base station, and specifically, may be an evolved Node B (Evolutional Node B, "ENB" or "E-NodeB" for short) in a Long Term Evolution (Long Term Evolution, "LTE" for short) system. The network side device may also be an access point (Access Point, "AP" for short) device.

To easily understand the technical solutions in the embodiments of the present invention, the following concepts are first described herein.

1) Clear channel assessment (Clear Channel Assessment, "CCA" for short)

The clear channel assessment (CCA for short below) refers to determining whether a channel is idle. IEEE802.15.4 defines three clear channel assessment modes. In a first mode, signal energy of a channel is simply determined. When the signal energy is lower than a threshold, it is considered that the channel is idle. In a second mode, a characteristic of a radio signal is determined. The characteristic mainly includes two aspects: a spread spectrum signal characteristic and a carrier frequency. A third mode is a combination of the first and the second modes. Both signal energy and a signal characteristic are detected, to determine whether a channel is idle.

FIG. 1 is a schematic diagram of performing a clear channel assessment (CCA) on a channel resource. Specifically, for example, when a determining result of an $i^{th}$ CCA is that a channel is occupied, a backoff is performed for a time period, and an $(i+1)^{th}$ CCA is further performed. The time period for the backoff may be referred to as a CCA interval 120 shown in FIG. 1. That is, the CCA interval 120 represents a time interval between the $(i+1)^{th}$ CCA and the $i^{th}$ CCA. Specifically, the CCA interval 120 may be determined as a time interval (as shown in FIG. 1) between a start moment of the $(i+1)^{th}$ CCA and a start moment of the $i^{th}$ CCA, or the CCA interval 120 may be determined as a time interval between an end moment of the $(i+1)^{th}$ CCA and an end moment of the $i^{th}$ CCA. This is not limited in this embodiment of the present invention, and i is a positive integer.

As shown in FIG. 1, a time length 110 of one CCA refers to a time interval between an end moment and a start moment of one CCA, that is, a time length that one CCA lasts. In current technologies, the CCA time length 110 is generally 18 μs or 20 μs. With development of related technologies, the CCA time length 110 may be assigned a new value. This is not limited in this embodiment of the present invention.

It should be further understood that, the CCA interval 120 shown in FIG. 1 is greater than or equal to the CCA time length 110.

In FIG. 1, if a determining result of the $(i+1)^{th}$ CCA is that a channel resource is idle, the channel resource may be occupied to send data. If a determining result of the $(i+1)^{th}$ CCA is that a channel resource is occupied, the backoff continues for one CCA interval, an $(i+2)^{th}$ CCA is performed, and so on, where i is a positive integer.

2) In the LAA-LTE system, a device uses a channel resource according to a listen before talk (Listen Before Talk, "LBT" for short) principle. LBT is a carrier sense multiple access (Carrier Sense Multiple Access, CSMA) technology, and operation modes of the LBT technology include a load based equipment (Load Based Equipment, "LBE" for short) operation mode and a frame based equipment (Frame Based Equipment, "FBE" for short) operation mode.

Figure 2:
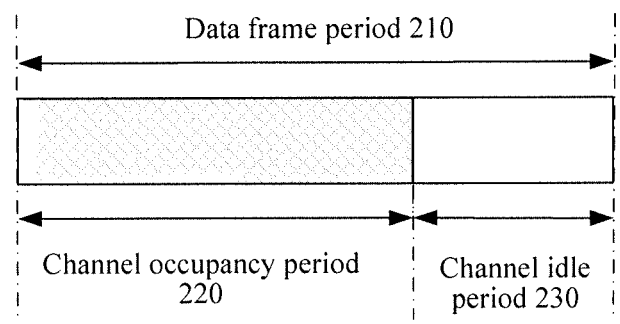
FIG. 2 a schematic diagram of a data frame period involved in an embodiment of the present invention.

In the frame based equipment (FBE) operation mode, a channel resource occupied by a data frame of data sent by a device includes a data transmission timeslot and an idle timeslot, and may also be referred to as a data frame period (Data Frame Period). The data frame period includes a channel occupancy period (Channel Occupy Period) and a channel idle period (Idle Period). Specifically, as shown in FIG. 2, a data frame period 210 includes a channel occupancy period 220 and a channel idle period 230. In one data frame period 210, a device transmits data only in the channel occupancy period 220, and no data is transmitted in the channel idle period 230. In current technologies, the channel idle period 230 usually accounts for at least 5% of the data frame period 210. In a future technology, the data frame period 210 may be further improved. For example, occupancy proportions of the channel occupancy period 220 and the channel idle period 230 in the data frame period 210 change. This is not limited in this embodiment of the present invention.

Currently, in the frame based equipment (FBE) operation mode, a device performs a CCA on a channel resource at an end of a channel idle period 230 of a data frame period 210 that currently transmitted data is in, to determine an occupancy status of the channel resource in a next data frame period. If a determining result is that the channel resource is idle, the channel resource is occupied to send data. If a determining result is that the channel resource is occupied, a backoff is performed for one data frame period 210 and then a CCA detection is performed, and so on. It may be known with reference to FIG. 1 that in an existing frame based equipment (FBE) operation mode, a CCA interval 120 at which a CCA detection is performed on a channel resource is equal to the data frame period 210. For example, when a data frame period 210 of data that a device occupies a channel resource to transmit is 10 ms, a CCA interval 120 at which the device uses a CCA to detect a channel resource is also 10 ms.

In the load based equipment (LBE) operation mode of the LBT, a CCA interval 120 at which a device uses a CCA to detect a channel resource is equal to a CCA time length 110. When a result of one CCA is that a channel resource is occupied, a next CCA is immediately started. For example, when the CCA time length 110 is 20 μs, the CCA interval 120 is also equal to 20 μs in the LBE operation mode.

It may be known by means of comparison that, a CCA interval used in the LBE operation mode is less than a CCA interval in the existing FBE operation mode. Consequently, when a device A that uses the existing FBE operation mode and a device B that uses the LBE operation mode preempt a channel resource on a same frequency band, a channel resource preemption probability of the device A is lower than a channel resource preemption probability of the device B. Currently, in the LBE operation mode, a backoff mechanism (Back Off) (or referred to as a CCA backoff process) is usually used to weaken unfairness of the foregoing channel resource occupancy. However, even if the CCA backoff process is used in the LBE, when the device A that uses the existing FBE operation mode and the device B that uses the LBE operation mode preempt a channel resource on a same frequency band, the channel resource preemption probability of the device A is still relatively low, and it is very difficult to ensure fairness of the channel resource occupancy between the devices.

It may be known from the foregoing description that, in the LAA-LTE system, when a channel resource is used in the existing FBE operation mode, a CCA interval is often relatively long, reducing a channel resource preemption probability of a device.

Figure 3:
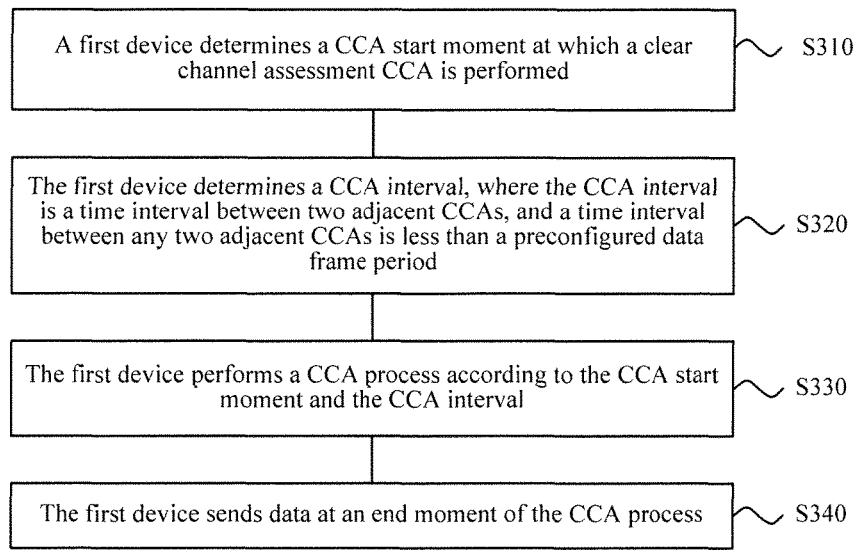
FIG. 3 is a schematic flowchart of a data transmission method according to an embodiment of the present invention.

FIG. 3 is a schematic flowchart of a data transmission method 300 according to an embodiment of the present invention. The method 300 is performed by a first device, and the method 300 includes the following steps.

S310: The first device determines a CCA start moment at which a clear channel assessment CCA is performed.

S320: The first device determines a CCA interval, where the CCA interval is a time interval between two adjacent CCAs, and a time interval between any two adjacent CCAs is less than a preconfigured data frame period.

S330: The first device performs a CCA process according to the CCA start moment and the CCA interval.

S340: The first device sends data at an end moment of the CCA process.

According to the data transmission method provided in this embodiment of the present invention, a channel resource preemption probability of a first device can be effectively increased by reducing a CCA interval at which a clear channel assessment (CCA) is performed on a channel resource.

The first device may be a device in a frame based equipment (FBE) operation mode. That is, data sent by the first device has a configurable data frame period 210. Correspondingly, in S340, the first device occupies a channel resource to send the data to a second device in the frame based equipment operation mode. More specifically, the first device and the second device are both devices in an LAA-LTE system.

Optionally, in an embodiment, the first device is a base station or user equipment.

In S310, when no channel resource is occupied to send data, the CCA start moment at which the CCA is performed on a channel resource is determined.

Optionally, in this embodiment of the present invention, the determining, by a first device, a CCA start moment at which a clear channel assessment CCA is performed in S310 includes the following step.

S311: The first device determines an end moment of a $Q^{th}$ second time length that is after an end moment of data transmission as the CCA start moment, where Q is zero or a positive integer.

The end moment of the data transmission specifically refers to an end moment of data sending performed by the first device by occupying a channel resource. For example, a data frame period of data that the first device occupies the channel resource to send is the data frame period 210 shown in FIG. 2, and the end moment of the data transmission refers to an end moment of the channel occupancy period 220.

The determining an end moment of the $Q^{th}$ second time length that is after an end moment of data transmission as the CCA start moment refers to determining the end moment of the $Q^{th}$ second time length that is after the end moment of the channel occupancy period 220 as the CCA start moment. Q may be equal to zero, and this is equivalent to that the end moment of the channel occupancy period 220 is used as the CCA start moment. Alternatively, Q may be a positive integer, and this is equivalent to that a particular moment that is after the end moment of the channel occupancy period 220 is used as the CCA start moment. Specifically, for example, an end moment of the data frame period 210 or a particular moment that is after an end moment of the data frame period 210 is used as the CCA start moment. This is not limited in this embodiment of the present invention.

Optionally, the second time length involved in S311 may be any one of the following time length information: a subframe time length, 1/K of a subframe time length, a timeslot time length, an orthogonal frequency division multiplexing OFDM symbol time length, 1/K of an OFDM symbol time length, or a sampling-interval time length, where K is a positive integer.

In current technologies, the subframe time length is 1 ms, and one subframe includes two timeslots. That is, the timeslot time length is 0.5 ms. One timeslot includes 12 or 14 OFDM symbols. Therefore, the OFDM symbol time length may be assigned different values in specific cases. The sampling-interval time length is (1/30720) ms. It should be understood that, the second time length in S311 may be further any other feasible time length unit, for example, 60 μs. This is not limited in this embodiment of the present invention.

Optionally, in this embodiment of the present invention, a sum of the Q second time lengths is not greater than the data frame period.

In the prior art, a CCA start moment is invariably an end moment of a data frame period. By comparison, in the data transmission method 300 provided in this embodiment of the present invention, a moment at which a CCA detection is started may be flexibly determined, and the CCA detection may be started before an end moment (which is equivalent to an end moment of the channel idle period 230 shown in FIG. 2) of a data frame period. This helps improve a channel resource occupancy probability of a device.

Optionally, in this embodiment of the present invention, the CCA start moment is any one of the following moments: a start moment of an OFDM symbol, a moment that corresponds to each 1/K of an OFDM symbol, a start moment of a timeslot, a start moment of a subframe, a start moment of a data frame, or a start moment of M sampling intervals, where K and M are positive integers.

Specifically, in this embodiment of the present invention, the CCA start moment may be further determined according to a preset moment on an unlicensed carrier, or the CCA start moment may be further determined according to a preset moment on a licensed carrier. This is not limited in this embodiment of the present invention.

Optionally, in this embodiment of the present invention, after the end moment of the data transmission performed by occupying the channel resource, the CCA start moment is determined according to any one of the following information: a start moment of an OFDM symbol on an unlicensed spectrum carrier, a start moment that corresponds to each 1/K of a time of the OFDM symbol on the unlicensed spectrum carrier, a start moment of a timeslot on the unlicensed spectrum carrier, a start moment of a subframe on the unlicensed spectrum carrier, a start moment of a data frame on the unlicensed spectrum carrier, or a start moment of M sampling intervals on the unlicensed spectrum carrier, where K is a positive integer greater than 1, and M is a positive integer.

Alternatively, the CCA start moment is determined according to any one of the following information: a start moment of an OFDM symbol on a licensed spectrum carrier, a start moment that corresponds to each 1/K of a time of the OFDM symbol on the licensed spectrum carrier, a start moment of a timeslot on the licensed spectrum carrier, a start moment of a subframe on the licensed spectrum carrier, a start moment of a data frame on the licensed spectrum carrier, or a start moment of M sampling intervals on the licensed spectrum carrier, where K is a positive integer greater than 1, and M is a positive integer.

It may be known from the foregoing description that, according to the data transmission method 300 provided in this embodiment of the present invention, a CCA start moment at which a CCA is performed on a channel resource may be flexibly determined, to satisfy different service requirements. The CCA detection may be started before an end moment (which is equivalent to an end moment of the channel idle period 230 shown in FIG. 2) of a data frame period. This helps improve a channel resource occupancy probability of a device.

In this embodiment of the present invention, the data frame period 210 of the data that the first device sends is configurable. In other words, before the first device sends the data, the data frame period 210 has already been determined, for example, 10 ms. It should be understood that, a respective weights of the channel occupancy period 220 and the channel idle period 230 in the data frame period 210 may be invariable or changeable. This is not limited in this embodiment of the present invention.

In S320, the CCA interval is determined. The CCA interval is the time interval between two adjacent CCAs, and the time interval between any two adjacent CCAs is less than the preconfigured data frame period 210. Specifically, a time interval between start moments (end moments) of any two adjacent CCAs is less than the preconfigured data frame period 210. In this way, when a determining result of one CCA is that a channel resource is occupied, there is no need to wait one data frame period 210 to start a next CCA, thereby improving a channel resource occupancy probability of the first device.

In this embodiment of the present invention, on the premise that the time interval between any two adjacent CCAs is ensured to be less than the data frame period 210, the CCA interval may be set to any feasible time length. For example, when the data frame period 210 is 10 ms, the CCA interval may be set to any time length less than 10 ms such as 0.5 ms or 0.04 ms.

Optionally, in this embodiment of the present invention, the determining, by the first device, a CCA interval in S320 includes the following step.

S320A: The first device determines that the time interval between two adjacent CCAs is L first time lengths, where L is a positive integer.

Specifically, it is determined that the time interval between two adjacent CCAs is one or more timeslot time lengths, or one or more orthogonal frequency division multiplexing (Orthogonal Frequency Division Multiplexing, "OFDM" for short) symbol time lengths, or one or more subframe time lengths, or multiple sampling-interval time lengths. For example, it is determined that the time interval between two adjacent CCAs is a time that corresponds to an integer multiple of a basic unit including 624 Ts, that is, 20.3 μs.

Optionally, in this embodiment of the present invention, the first time length in S320A is any one of the following time length information: a subframe time length, 1/K of a subframe time length, a timeslot time length, an OFDM symbol time length, 1/K of an OFDM symbol time length, or a sampling-interval time length, where K is a positive integer.

In current technologies, the subframe time length is 1 ms, and one subframe includes two timeslots. That is, the timeslot time length is 0.5 ms. One timeslot includes 12 or 14 OFDM symbols. Therefore, the OFDM symbol time length may be assigned different values in specific cases. The sampling-interval time length is (1/30720) ms.

It should be understood that, the first time length involved in S320A may be other time length information in addition to the foregoing time length information. This is not limited in this embodiment of the present invention.

Optionally, in this embodiment of the present invention, the determining, by the first device, a CCA interval in S320 includes the following step.

S320B: The first device determines that the time interval between two adjacent CCAs is a time length of one CCA.

Specifically, with reference to the schematic diagram in FIG. 1, the CCA interval 120 is equal to a time length 110 of one CCA. That is, after one CCA is ended, a next CCA is immediately started, and there is no idle time between the two adjacent CCAs. In current technologies, a time length 110 of one CCA is usually 18 μs or 20 μs. That is, in this embodiment of the present invention, the CCA interval is equal to 18 μs or 20 μs.

It should be understood that, with development of technologies, a time length 110 of one CCA may be assigned another value in the future, and the CCA interval 120 used in this embodiment of the present invention also correspondingly changes. This is not limited in this embodiment of the present invention.

More specifically, for example, the CCA interval is equal to a CCA interval of a third device. The third device is a device in a load based equipment (LBE) operation mode in the LAA-LTE system. For example, when the CCA interval used by the third device is 20 μs, the CCA interval involved in this embodiment of the present invention is also 20 μs.

Therefore, compared with an existing FBE operation mode in which a CCA interval is set to a data frame period, according to the data transmission method provided in this embodiment of the present invention, a channel resource preemption probability of a device can be effectively increased by reducing a CCA interval at which a clear channel assessment (CCA) is performed. In addition, on the premise that the CCA interval is less than a data frame period, the CCA interval can be flexibly set, to improve applicability of the technical solution provided in this embodiment of the present invention.

It should be understood that, in this embodiment of the present invention, the CCA interval may be configured before the CCA is performed, or may be temporarily configured. This is not limited in this embodiment of the present invention. In addition, the CCA interval may be kept unchanged. That is, the time interval between any two adjacent CCAs is the same, for example, 0.05 ms. In this case, the CCA interval may also be referred to as a CCA period.

It should be further understood that, the CCA interval in this embodiment of the present invention may be variable. That is, a time interval between any two adjacent CCAs is not completely the same. For example, in a first time period, a time interval between any two adjacent CCAs is L1 first preset time lengths, and in a second time period, a time interval between any two adjacent CCAs is L2 second preset time lengths. The second preset time length is unequal to the first preset time length. That is, CCA intervals in the first time period and the second time period may be different.

Optionally, in this embodiment of the present invention, the determining, by the first device, a CCA interval in S320 includes the following step.

S320C: The first device determines a time interval between every two adjacent CCAs, where the time intervals are the same or different.

Specifically, assuming that the preconfigured data frame period 210 is 10 ms, in a first time period from the CCA start moment determined in S310, it is determined that a time interval between any two adjacent CCAs is 0.04 ms, and in a second time period (that is, a time period from an end moment of the first time period), it is determined that a time interval between any two adjacent CCAs is 0.01 ms.

Optionally, in this embodiment of the present invention, the CCA interval may be duration of an OFDM symbol, or a start moment of each CCA is a start moment of an OFDM symbol.

Therefore, compared with an existing FBE operation mode in which a CCA interval is invariably set to a data frame period, according to the data transmission method provided in this embodiment of the present invention, a channel resource preemption probability of a device can be effectively increased by reducing a CCA interval. In addition, different CCA intervals may be set for different time periods. This helps improve applicability of the solution.

In this embodiment of the present invention, the CCA start moment and the CCA interval are configurable. Specifically, the CCA start moment and the CCA interval may be configured by the first device at a transmit end, or may be configured by the second device on a data receive end, or may be configured by a network side device other than the first device at the transmit end and the second device at the receive end. This is not limited in this embodiment of the present invention.

Optionally, in this embodiment of the present invention, the determining, by the first device, a CCA start moment in S310 and the determining, by the first device, a CCA interval in S320 include:

configuring, by the first device, the CCA start moment and the CCA interval; or receiving, by the first device, information that is sent by the second device at the data receive end for indicating the CCA start moment and the CCA interval; or receiving, by the first device, information that is sent by a network side device for indicating the CCA start moment and the CCA interval.

For example, when the CCA start moment and the CCA interval are configured by the first device, the first device needs to notify the second device at the receive end of the CCA start moment and the CCA interval that are configured, so that the second device detects a data signal according to the CCA start moment and the CCA interval, so as to effectively receive the data sent by the first device.

For another example, when the CCA start moment and the CCA interval are configured by the network side device other than the first device at the transmit end and the second device at the receive end, the network side device separately notifies the first device and the second device of the CCA start moment and the CCA interval that are configured, so as to effectively perform data transmission.

In S330, the CCA process is performed according to the CCA start moment determined in S310 and the CCA interval determined in S320. The CCA process includes at least one CCA. Specifically, beginning with the CCA start moment, a CCA is performed on a channel resource according to other CCA detection time points that are determined according to the CCA start moment and the CCA interval. That is, one CCA is performed at each CCA detection time point. It should be understood that, in the foregoing, a CCA is performed on a channel resource when no data is sent, to determine whether the channel resource is idle.

In S340, the first device sends the data at the end moment of the CCA process.

Optionally, in this embodiment of the present invention, the sending, by the first device, the data at an end moment of the CCA process in S340 includes the following steps.

S341: When determining that a channel resource is idle, the first device determines that the CCA process ends.

S342: The first device sends the data at the end moment of the CCA process.

Figure 4:
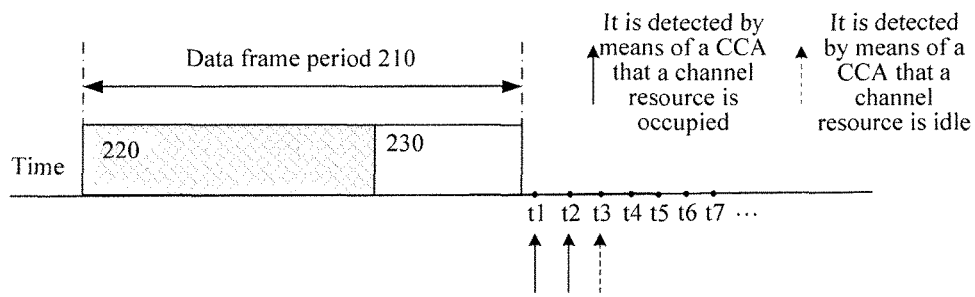
FIG. 4 is a schematic diagram of a data transmission method according to an embodiment of the present invention.

Specifically, the CCA process is described with reference to FIG. 4. As shown in FIG. 4, a data frame period 210 of the first device includes a channel occupancy period 220 and a channel idle period 230. A CCA start moment is a moment t1 that is after an end moment of the channel occupancy period 220. Other CCA detection time points may be determined according to the CCA start moment t1 and the CCA interval. For example, FIG. 4 shows only time points t2 to t7. The first CCA is performed on a channel resource at the CCA start moment t1. Assuming that it is determined that the channel resource is occupied, the second CCA is performed on a channel resource at a second CCA detection time point t2. Assuming that it is again determined that the channel resource is occupied, the third CCA is performed on a channel resource at a third CCA detection time point t3. As shown in FIG. 4, assuming that a determining result of the third CCA is that the channel resource is idle, it is determined that the foregoing CCA process ends.

It should be understood that, in the example in FIG. 4, the CCA process includes three CCAs. It should be further understood that, the example shown in FIG. 4 is intended to help a person skilled in the art better understand this embodiment of the present invention, instead of limiting the scope of this embodiment of the present invention. Apparently, a person skilled in the art may make various equivalent modifications or changes according to the example provided in FIG. 4, and such modifications or changes also fall within the scope of this embodiment of the present invention. For example, if the CCA process ends when a determining result of the mth CCA is that a channel resource is idle, the CCA process includes m CCAs, where m is a positive integer. If it is determined that the CCA process ends when a determining result of the first CCA performed at the moment t1 is that the channel resource is idle, it is equivalent that the CCA process includes only one CCA.

In S342, the channel resource is occupied to send the data at the end moment of the CCA process. Specifically, in the example in FIG. 4, an end moment of the third CCA is the end moment of the CCA process. That is, the channel resource is occupied at the end moment of the third CCA to send the data. If a determining result of the mth CCA is that a channel resource is idle, the end moment of the CCA process is an end moment of the mth CCA, and then the channel resource is occupied to send the data at the end moment of the mth CCA.

It may be known from the foregoing description that, in this embodiment of the present invention, a CCA interval at which a clear channel assessment CCA is performed on a channel resource is less than a preconfigured data frame period. Compared with solutions in an existing FBE operation mode, a channel resource preemption probability of a device can be effectively increased.

Several specific examples are described in detail below with reference to FIG. 5. It is assumed that a device A occupies a channel according to the technical solution (marked as a manner 1) described in S310, S320, S330, S341, and S342 provided in this embodiment of the present invention, and a device B occupies a channel by acting as an existing load based equipment (LBE) operation mode device (marked as a manner 2). FIG. 5(a) to FIG. 5(c) separately provide channel preemption probabilities of the device A and the device B on three different conditions. In FIG. 5(a) to FIG. 5(c), a horizontal coordinate represents a CCA interval used by the device A, and a vertical coordinate represents channel occupancy probabilities of the two manners. It should be understood that, a sum of the channel preemption probabilities of the device A and the device B is 1.

FIG. 5(a) shows channel preemption probabilities of the device A and the device B on a first simulation condition. The first simulation condition is: A preconfigured data frame period 210 of the device A is 1 ms, and CCA intervals used by the device A are separately 0.06 ms, 0.12 ms, 0.18 ms, 0.24 ms, 0.30 ms, 0.36 ms, 0.42 ms, 0.48 ms, 0.54 ms, and 0.6 ms. A frame length of a channel resource occupied by data sent by the device B is random, and a CCA interval used by the device B is a time length 110 of one CCA. A simulation time granularity is 20 μs.

It may be known from FIG. 5(a) that, a shorter CCA interval used by the device A indicates a higher channel occupancy probability of the device A, compared with the device B.

FIG. 5(b) shows channel preemption probabilities of the device A and the device B on a second simulation condition. The second simulation condition is: A preconfigured data frame period 210 of the device A is 5 ms, and CCA intervals used by the device A are separately 0.04, 0.06 ms, 0.12 ms, 0.18 ms, 0.24 ms, 0.30 ms, 0.36 ms, 0.42 ms, 0.48 ms, 0.54 ms, and 0.6 ms. A frame length of a channel resource occupied by data sent by the device B is random, and a CCA interval used by the device B is a time length 110 of one CCA. A simulation time granularity is 20 μs.

It may be known from FIG. 5(b) that, a shorter CCA interval used by the device A indicates a higher channel occupancy probability of the device A, compared with the device B. In addition, it may be further seen that, when the preconfigured data frame period of the device A is 5 ms and the CCA interval used by the device A is 0.04 ms, the channel preemption probabilities of the device A and the device B are the same.

FIG. 5(c) shows channel preemption probabilities of the device A and the device B on a third simulation condition. The third simulation condition is: A preconfigured data frame period 210 of the device A is 10 ms, and CCA intervals used by the device A are separately 0.04 ms, 0.06 ms, 0.12 ms, 0.18 ms, 0.24 ms, 0.30 ms, 0.36 ms, 0.42 ms, 0.48 ms, 0.54 ms, and 0.6 ms. A frame length of a channel resource occupied by data sent by the device B is random, and a CCA interval used by the device B is a time length 110 of one CCA. A simulation time granularity is 20 μs.

It may be known from FIG. 5(c) that, a shorter CCA interval used by the device A indicates a higher channel occupancy probability of the device A, compared with the device B. For example, when the CCA interval used by the device A is between 0.06 ms and 0.24 ms, the channel occupancy probability of the device A is higher than the channel occupancy probability of the device B. In addition, it may be further seen that, when the preconfigured data frame period of the device A is 10 ms and the CCA interval used by the device A is 0.24 ms, the channel preemption probabilities of the device A and the device B are the same.

It may be known from the examples shown in FIG. 5(b) and FIG. 5(c) that, according to the data transmission method 300 provided in this embodiment of the present invention, fairness of channel resource occupancy between devices can be maintained by adjusting a CCA interval.

It should be noted that as shown in FIG. 5(c), when the CCA intervals are 0.42 ms, a singular point occurs. That is, the channel occupancy probability of the device B is greatly higher than the channel occupancy probability of the device A. This is mainly due to that at the singular point, most CCA detections of the device A are performed just at moments at which the device B occupies a channel to send data. Therefore, the channel occupancy probability of the device A is relatively low. It should be understood that, only two devices (the device A and the device B) are specified in the simulation environment to preempt a same unlicensed spectrum, but in actual applications, usually multiple devices preempt a same unlicensed spectrum. Therefore, usually, a situation like the singular point shown in FIG. 5(c) seldom occurs in actual applications.

It may be further known from FIG. 5(a) to FIG. 5(c) that, in some cases, when the same CCA interval 120 is used, a longer data frame period 210 of data sent by the device A indicates a higher channel occupancy probability of the device A, compared with the device B. For example, in FIG. 5(b), the data frame period of the device A is 5 ms, and when a CCA interval of 0.06 ms is used, the channel occupancy probability of the device A is lower than the channel occupancy probability of the device B. However, in FIG. 5(c), the data frame period of the device A is 10 ms, and when the CCA interval of 0.06 ms is used, the channel occupancy probability of the device A is higher than the channel occupancy probability of the device B. Therefore, in an actual application, a more suitable CCA interval may be obtained by means of adjustment according to the preconfigured data frame period. However, the determining of the CCA interval in this embodiment of the present invention is not limited by a value of the data frame period.

Figure 5:
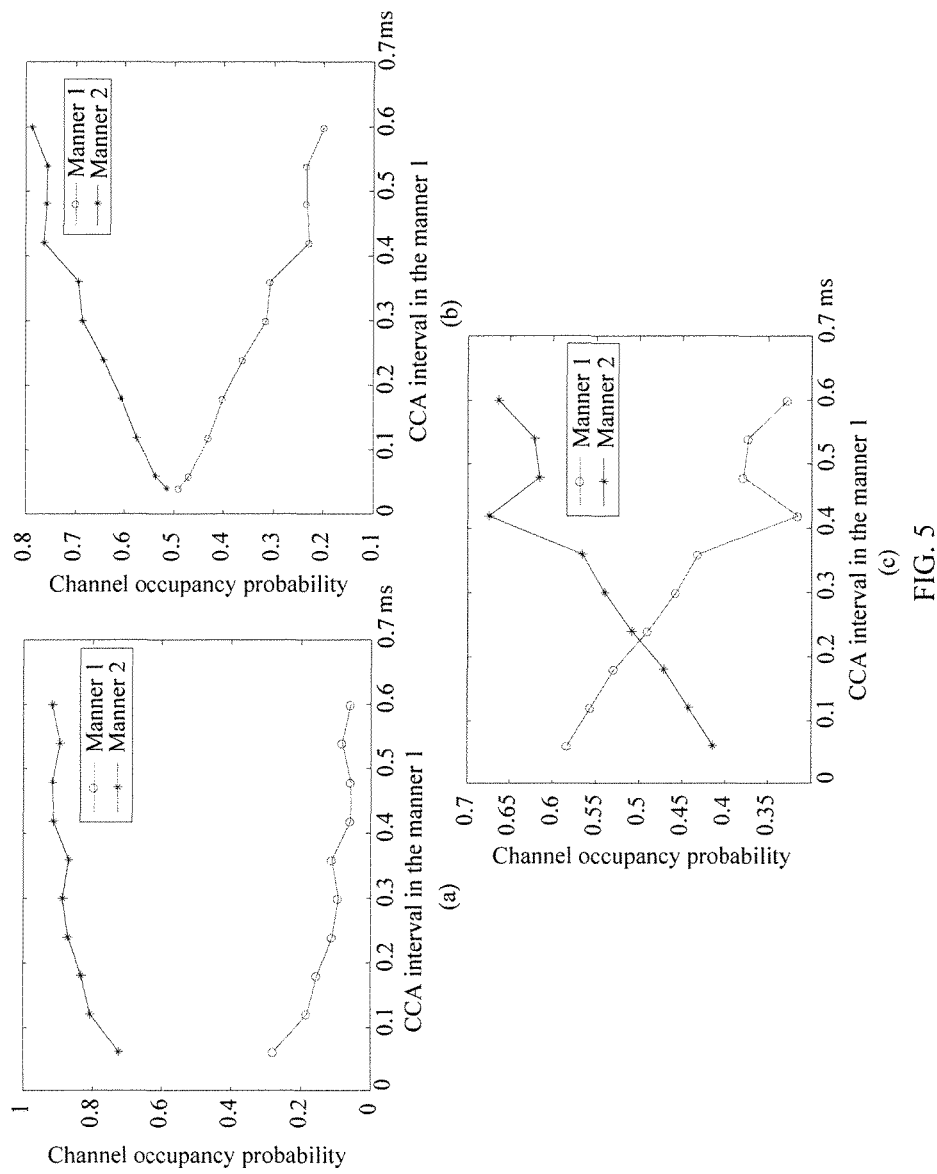
FIG. 5, (a), (b) and (c), is another schematic diagram of a data transmission method according to an embodiment of the present invention.

It may be known from the foregoing description with reference to the example shown in FIG. 5 that, according to the data transmission method provided in this embodiment of the present invention, a channel resource preemption probability of a first device can be effectively increased by reducing a CCA interval at which a clear channel assessment (CCA) detection is performed on a channel resource. Further, by means of adjustment of the CCA interval, the first device and another device (for example, the device B shown in FIG. 5) may have an equal channel occupancy probability when the first device and the another device preempt a same channel resource. That is, fair channel resource contention can be implemented.

Optionally, in this embodiment of the present invention, the determining, by the first device, that a time interval between two adjacent CCAs is L first time lengths in S320A includes:

when the data frame period is 5 ms, determining, by the first device, that the time interval between two adjacent CCAs is 0.04 ms; or when the data frame period is 10 ms, determining, by the first device, that the time interval between two adjacent CCAs is 0.24 ms.

It should be understood that, the three specific examples shown in FIG. 5 are intended to help a person skilled in the art better understand this embodiment of the present invention, instead of limiting the scope of this embodiment of the present invention.

According to the data transmission method provided in the embodiments of the present invention, a channel resource preemption probability of a device can be effectively increased by reducing a CCA interval at which a clear channel assessment (CCA) is performed on a channel resource. Fairness of channel resource occupancy between devices can be further effectively maintained by adjusting the CCA interval.

It should be further understood that, the device B involved in FIG. 5 may be further a conventional WiFi device. A channel occupancy method of the WiFi device is similar to the load based equipment (LBE) operation mode. For brevity, details are not described herein again.

To balance fairness of channel resource occupancy between devices, in this embodiment of the present invention, a CCA backoff process may also be used as the CCA process in S330.

Optionally, in this embodiment of the present invention, the performing, by the first device, a CCA process according to the CCA start moment and the CCA interval in S330 includes:

performing, by the first device, the CCA process according to the CCA start moment, the CCA interval, and an initial backoff value N0, where the CCA process is a CCA backoff process, and N0 is a positive integer.

Optionally, in this embodiment of the present invention, the sending, by the first device, the data at an end moment of the CCA process in S340 includes the following steps.

S343: When determining that a backoff result of the CCA backoff process satisfies a backoff condition, the first device determines that the CCA process ends.

S344: The first device sends the data at the end moment of the CCA process.

Specifically, the foregoing CCA backoff process is specifically: performing M CCA detections on a channel resource according to the CCA start moment, the CCA interval, and the initial backoff value N0. A determining result of an Mth CCA in the M CCA detections is that a channel resource is idle, and a current backoff value Nm of the Mth CCA detection is equal to 0, where N0 is a positive integer, and M is an integer greater than or equal to N0. An end moment of the Mth CCA is the end moment of the CCA backoff process.

During the M CCA detections, when a determining result of an ith CCA is that a channel resource is idle, it is determined that a current backoff value Ni of the ith CCA is Ni-1-1. When a determining result of an ith CCA is that a channel resource is occupied, it is determined that a current backoff value Ni of the ith CCA is Ni-1. Ni-1 is a current backoff value of an (i-1)th CCA, and i is 1, . . . , M-1. A current backoff value Nm-1 of an (M-1)th CCA is equal to 1.

Figure 6:
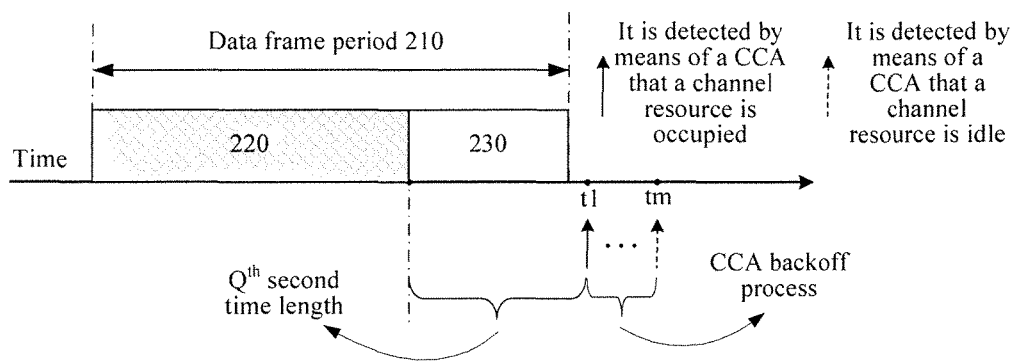
FIG. 6 is still another schematic diagram of a data transmission method according to an embodiment of the present invention.

The foregoing CCA backoff process is described below with reference to FIG. 6. As shown in FIG. 6, a data frame period 210 of the first device includes a channel occupancy period 220 and a channel idle period 230. A CCA start moment is an end moment t1 of a Qth second time length that is after an end moment of the channel occupancy period 220, and t1 is also a start moment of the CCA backoff process. Other CCA detection time points may be determined according to the CCA start moment t1 and the CCA interval. FIG. 6 shows only the CCA start time point t1 and a CCA detection time point tm. It should be understood that, time points t2, t3, tm-1 further exist between the time point t1 and the time point tm. For example, the initial backoff value N0 is equal to 5, and the CCA backoff process is: The first CCA is performed on a channel resource at the CCA start moment t1. Assuming that a determining result of the first CCA is that the channel resource is idle, a current backoff value N1 of the first CCA is equal to N0-1. That is, N1 is equal to 4. The second CCA is performed on a channel resource at a second CCA detection time point t2. Assuming that a result of the second CCA detection is that the channel resource is occupied, a current backoff value N2 of the second CCA detection is equal to N1. That is, N2 is equal to 4. The third CCA is performed on a channel resource at a third CCA detection time point t3, and so on. If a current backoff value of a current CCA is not zero, a CCA continues to be performed at a next CCA detection time point. The CCA backoff process based on the CCA start moment t1, the CCA interval, and the initial backoff value N0 ends when a determining result of an mth CCA is that a channel resource is idle, and a current backoff value Nm of the current CCA (that is, the mth CCA) is equal to 0. It should be understood that, m in the foregoing CCA backoff process is greater than or equal to 5.

It should be understood that, the initial backoff value N0 in this embodiment of the present invention may be randomly selected between [1, n], where n is a positive integer. Specifically, for example, N0 may be selected between [1, 9].

It should be further understood that, a backoff condition of the foregoing CCA backoff process is: A determining result of a current CCA is that a channel resource is idle, and a current backoff value is equal to B, where B is zero. Optionally, B may be set to a positive integer according to a specific need.

In this embodiment of the present invention, specifically, when it is determined that the time interval (the CCA interval 120) between any two adjacent CCAs is set to the CCA time length 110, the foregoing CCA backoff process is used when a CCA is performed on a channel resource, to effectively maintain fairness of channel resource preemption between devices.

Therefore, according to the data transmission method provided in this embodiment of the present invention, on one hand, a channel preemption probability of a first device can be effectively increased by reducing a CCA interval at which a clear channel assessment (CCA) is performed on a channel resource. On the other hand, fairness of channel resource preemption between devices can be maintained by using a CCA backoff process.

It should be understood that, in this embodiment of the present invention, the data frame period 210 is preconfigured. That is, both the device on the data transmit end and the device on the receive end know the data frame period 210 before the data is transmitted. For example, the system preconfigures the data frame period 210, and notifies the device on the transmit end and the device on the receive end of the data frame period 210. Certainly, the data frame period 210 may be configured by the device on the transmit end or the device on the receive end, and notified to the peer device. It should be further understood that, the preconfigured data frame period 210 is not kept unchanged. For example, the data frame period 210 is set to 10 ms in the first time period, and the data frame period 210 is set to 5 ms in the second time period. This is not limited in this embodiment of the present invention.

It should be further understood that, the data transmission method provided according to this embodiment of the present invention is applicable to the LAA-LTE system, or is applicable to another system to which the data transmission method can be applied. This is not limited in this embodiment of the present invention.

It should be further understood that, in this specification, an entity for executing the data transmission method 300 is marked as the first device, and the device on the data receive end is marked as the second device. The first device and the second device are only used for distinction, to make a person skilled in the art understand the technical solutions in this embodiment of the present invention more clearly, instead of limiting the device in this embodiment of the present invention.

It should be further understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The foregoing describes data transmission methods according to embodiments of the present invention in detail with reference to FIG. 1 to FIG. 6. The following describes data transmission devices according to embodiments of the present invention with reference to FIG. 7 and FIG. 8.

Figure 7:
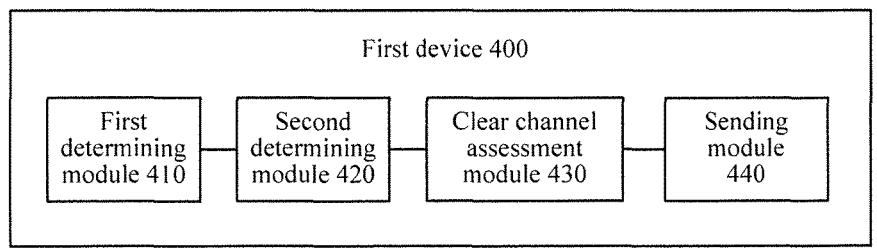
FIG. 7 is a schematic block diagram of a first device according to an embodiment of the present invention.

FIG. 7 is a schematic block diagram of a first device 400 according to an embodiment of the present invention. The first device 400 includes:

a first determining module, configured to determine a CCA start moment at which a clear channel assessment CCA is performed;

a second determining module, configured to determine a CCA interval, where the CCA interval is a time interval between two adjacent CCAs, and a time interval between any two adjacent CCAs is less than a preconfigured data frame period;

a clear channel assessment module, configured to perform a CCA process according to the CCA start moment determined by the first determining module and the CCA interval determined by the second determining module; and a sending module, configured to send data at an end moment of the CCA process of the clear channel assessment module.

Therefore, according to the first device provided in this embodiment of the present invention, a channel resource occupancy probability of a device can be effectively increased by reducing a CCA interval at which a clear channel assessment (CCA) is performed on a channel resource.

It should be understood that, the first device involved in this embodiment of the present invention is only used for distinction, and does not impose any limitation on the device.

Specifically, the sending module 440 is specifically configured to occupy a channel resource to send the data to a second device in a licensed-assisted access using Long Term Evolution (LAA-LTE) system. More specifically, the sending module 440 is specifically configured to send the data to the second device by using an unlicensed carrier.

Optionally, in an embodiment, the second determining module is specifically configured to determine that the time interval between two adjacent CCAs is L first time lengths, where L is a positive integer.

Optionally, in an embodiment, the first time length is any one of the following time length information: a subframe time length, 1/K of a subframe time length, a timeslot time length, an orthogonal frequency division multiplexing OFDM symbol time length, 1/K of an OFDM symbol time length, or a sampling-interval time length, where K is a positive integer.

Optionally, in an embodiment, the second determining module is specifically configured to: when the data frame period is 5 ms, determine that the time interval between two adjacent CCAs is 0.04 ms; or the second determining module is specifically configured to: when the data frame period is 10 ms, determine that the time interval between two adjacent CCAs is 0.24 ms.

Optionally, in an embodiment, the second determining module is specifically configured to determine that the time interval between two adjacent CCAs is a time length of one CCA.

Optionally, in an embodiment, the second determining module is specifically configured to determine a time interval between every two adjacent CCAs, where the time intervals are the same or different.

Optionally, in an embodiment, the first determining module is specifically configured to determine an end moment of a Qth second time length that is after an end moment of data transmission as the CCA start moment, where Q is zero or a positive integer.

Optionally, in an embodiment, a sum of the Q second time lengths is not greater than the preconfigured data frame period Optionally, in an embodiment, the clear channel assessment module is specifically configured to perform the CCA process according to the CCA start moment, the CCA interval, and an initial backoff value N0, where the CCA process is a CCA backoff process, and N0 is a positive integer.

Optionally, in an embodiment, the CCA start moment is any one of the following moments: a start moment of an OFDM symbol, a moment that corresponds to each 1/K of an OFDM symbol, a start moment of a timeslot, a start moment of a subframe, a start moment of a data frame, or a start moment of M sampling intervals, where K and M are positive integers.

Optionally, in an embodiment, the first device is a base station or user equipment.

It should be understood that the first device 400 according to this embodiment of the present invention may correspond to the first device in the data transmission method 300 in the embodiment of the present invention, and the foregoing and other operations and/or functions of the modules of the first device 400 are separately used to implement the corresponding procedures of the methods in FIG. 3 to FIG. 5. For brevity, details are not described herein again.

Therefore, according to the first device provided in this embodiment of the present invention, a channel resource occupancy probability of a device can be effectively increased by reducing a CCA interval at which a clear channel assessment (CCA) is performed on a channel resource.

Figure 8:
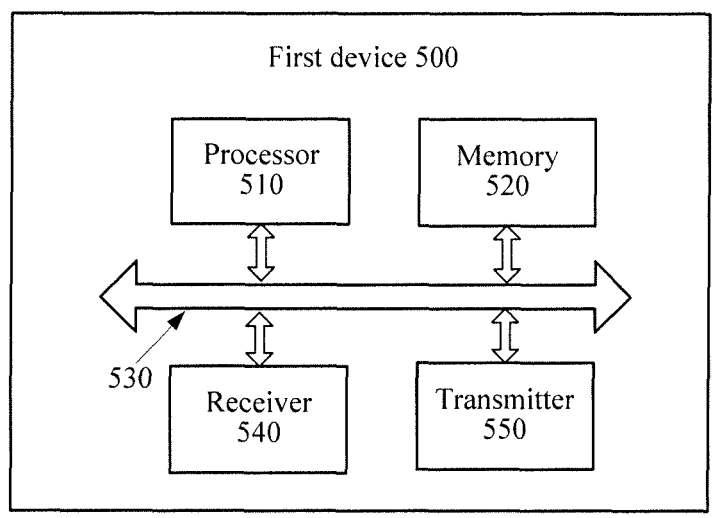
FIG. 8 is a schematic block diagram of a first device according to another embodiment of the present invention.

As shown in FIG. 8, an embodiment of the present invention further provides a first device 500. The first device 500 includes a processor 510, a memory 520, a bus system 530, a receiver 540, and a transmitter 550. The processor 510, the memory 520, the receiver 540, and the transmitter 550 are connected by using the bus system 530. The memory 520 is configured to store an instruction. The processor 510 is configured to execute the instruction stored in the memory 520, to control the receiver 540 to receive a signal, and control the transmitter 550 to send a signal. The processor 510 is configured to: determine a CCA start moment at which a clear channel assessment CCA is performed; determine a CCA interval, where the CCA interval is a time interval between two adjacent CCAs, and a time interval between any two adjacent CCAs is less than a preconfigured data frame period; and perform a CCA process according to the CCA start moment and the CCA interval. The transmitter 550 is specifically configured to send data at an end moment of the CCA process.

Therefore, according to the first device provided in this embodiment of the present invention, a channel resource preemption probability of the first device can be effectively increased by reducing a CCA interval at which a clear channel assessment (CCA) is performed on a channel resource.

Optionally, in an embodiment, the processor 510 is specifically configured to determine that the time interval between two adjacent CCAs is L first time lengths, where L is a positive integer.

Optionally, in an embodiment, the first time length is any one of the following time length information: a subframe time length, 1/K of a subframe time length, a timeslot time length, an orthogonal frequency division multiplexing OFDM symbol time length, 1/K of an OFDM symbol time length, or a sampling-interval time length, where K is a positive integer.

Optionally, in an embodiment, the processor is specifically configured to: when the data frame period is 5 ms, determine that the time interval between two adjacent CCAs is 0.04 ms; or the processor is specifically configured to: when the data frame period is 10 ms, determine that the time interval between two adjacent CCAs is 0.24 ms.

Optionally, in an embodiment, the processor is specifically configured to determine that the time interval between two adjacent CCAs is a time length of one CCA.

Optionally, in an embodiment, the processor is specifically configured to determine a time interval between every two adjacent CCAs, where the time intervals are the same or different.

Optionally, in an embodiment, the processor is specifically configured to determine an end moment of a Qth second time length that is after an end moment of data transmission as the CCA start moment, where Q is zero or a positive integer.

Optionally, in an embodiment, a sum of the Q second time lengths is not greater than the preconfigured data frame period Optionally, in an embodiment, the processor is specifically configured to perform the CCA process according to the CCA start moment, the CCA interval, and an initial backoff value N0, where the CCA process is a CCA backoff process, and N0 is a positive integer.

Optionally, in an embodiment, the CCA start moment is any one of the following moments: a start moment of an OFDM symbol, a moment that corresponds to each 1/K of an OFDM symbol, a start moment of a timeslot, a start moment of a subframe, a start moment of a data frame, or a start moment of M sampling intervals, where K and M are positive integers.

Optionally, in an embodiment, the first device is a base station or user equipment.

It should be understood that in this embodiment of the present invention, the processor 510 may be a central processing unit (Central Processing Unit, "CPU" for short), or the processor 510 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any conventional processor or the like.

The memory 520 may include a read-only memory and a random access memory, and provides an instruction and data to the processor 510. A part of the memory 520 may further include a non-volatile random access memory. For example, the memory 520 may further store device type information.

The bus system 530 may include a power bus, a control bus, a status signal bus, and the like in addition to a data bus. However, for purpose of clear description, various types of buses in the figure are all marked as the bus system 530.

In an implementation process, the steps of the foregoing methods may be completed by using an integrated logical circuit of hardware in the processor 510 or an instruction in a form of software. Steps of the methods disclosed with reference to the embodiments of the present invention may be directly performed and completed by means of a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 520, and the processor 510 reads information in the memory 520 and completes the steps of the foregoing methods in combination with hardware of the processor 510. To avoid repetition, details are not described herein again.

It should be understood that the first device 500 according to this embodiment of the present invention may correspond to the first device in the data transmission method 300 in the embodiment of the present invention, or may correspond to the first device 400 in the embodiment of the present invention. The foregoing and other operations and/or functions of the modules of the first device 500 are separately used to implement the corresponding procedures of the methods in FIG. 3 to FIG. 5. For brevity, details are not described herein again.

Therefore, according to the first device provided in this embodiment of the present invention, a channel resource preemption probability of the first device can be effectively increased by reducing a CCA interval at which a clear channel assessment (CCA) is performed on a channel resource.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, modules and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the several embodiments provided in the present application, it should be understood that the disclosed device and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed.

The modules described as separate parts may or may not be physically separate, and parts displayed as modules may or may not be physical units, may be located in one position, or may be distributed on a plurality of network units. Some or all of the units may be selected according to actual needs to achieve the objectives of the solutions of the embodiments.

In addition, functional modules in the embodiments of the present invention may be integrated into one processing unit, or each of the modules may exist alone physically, or two or more modules are integrated into one module.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
determining, by a first device, a clear channel assessment (CCA) start moment at which a CCA is performed to determine whether a channel is idle or occupied;
determining, by the first device, a CCA interval, wherein the CCA interval is a time interval between two adjacent CCAs, and a time interval between any two adjacent CCAs is less than a preconfigured data frame period, the preconfigured data frame period including a channel occupancy period and a channel idle period;
performing, by the first device, a CCA process according to the CCA start moment and the CCA interval; and
sending, by the first device, data at an end moment of the CCA process,
wherein the determining, by the first device, the CCA start moment at which the CCA is performed comprises:
determining, by the first device, an end moment of a $Q^{th}$ second time length that is after an end moment of data transmission as the CCA start moment,
Q is zero or a positive integer, and
a sum of the Q second time lengths is not greater than the preconfigured data frame period.

2. The method according to claim 1, wherein the determining, by the first device, the CCA interval comprises:
determining, by the first device, that the time interval between two adjacent CCAs is L first time lengths, wherein L is a positive integer.

3. The method according to claim 2, wherein the first time length is any one of the following time length information: a subframe time length, 1/K of a subframe time length, a timeslot time length, an orthogonal frequency division multiplexing OFDM symbol time length, 1/K of an OFDM symbol time length, or a sampling-interval time length, wherein K is a positive integer.

4. The method according to claim 1, wherein the determining, by the first device, the CCA interval comprises:
determining, by the first device, that the time interval between two adjacent CCAs is a time length of one CCA.

5. The method according to claim 1, wherein the determining, by the first device, the CCA interval comprises:
determining, by the first device, a time interval between every two adjacent CCAs, wherein the time intervals are the same or different.

6. The method according to claim 1, wherein the performing, by the first device, the CCA process according to the CCA start moment and the CCA interval comprises:
performing, by the first device, the CCA process according to the CCA start moment, the CCA interval, and an initial backoff value $N_0$, wherein the CCA process is a CCA backoff process, and $N_0$ is a positive integer.

7. The method according to claim 1, wherein
the Qth second time length corresponds to any one of the following: a subframe time length, 1/K of a subframe time length, a timeslot time length, an orthoqonal frequency division multiplexing (OFDM) symbol time length, 1/K of an OFDM symbol time length, or a sampling-interval time length, and
K is a positive integer.

8. The method according to claim 1, wherein the first device is a base station or user equipment.

9. A first device, comprising:
a memory, configured to store an instruction;
a transmitter, configured to send data; and
a processor, configured to execute the instruction stored in the memory, and to:
determine a clear channel assessment (CCA) start moment at which a CCA is performed to determine whether a channel is idle or occupied,
determine a CCA interval, wherein the CCA interval is a time interval between two adjacent CCAs, and a time interval between any two adjacent CCAs is less than a preconfigured data frame period, the preconfigured data frame period including a channel occupancy period and a channel idle period,
perform a CCA process according to the CCA start moment and the CCA interval, and
control the transmitter to send the data at an end moment of the CCA process,
wherein
the processor is configured to determine an end moment of a $Q^{th}$ second time length that is after an end moment of data transmission as the CCA start moment,
Q is zero or a positive integer, and
a sum of the Q second time lengths is not greater than the preconfigured data frame period.

10. The first device according to claim 9, wherein the processor is configured to determine that the time interval between two adjacent CCAs is L first time lengths, wherein L is a positive integer.

11. The first device according to claim 9, wherein the processor is configured to determine that the time interval between two adjacent CCAs is a time length of one CCA.

12. The first device according to claim 9, wherein the processor is configured to determine a time interval between every two adjacent CCAs, wherein the time intervals are the same or different.

13. The first device according to claim 9, wherein the processor is configured to perform the CCA process according to the CCA start moment, the CCA interval, and an initial backoff value $N_0$, wherein the CCA process is a CCA backoff process, and $N_0$ is a positive integer.

14. The first device according to claim 9, wherein the first device is a base station or user equipment.

15. The first device according to claim 9, wherein
the Qth second time length corresponds to any one of the following: a subframe time length, 1/K of a subframe time length, a timeslot time length, an orthogonal frequency division multiplexing (OFDM) symbol time length, 1/K of an OFDM symbol time length, or a sampling-interval time length, and
K is a positive integer.

16. The first device according to claim 9, wherein
the channel occupancy period is greater than the channel idle period, and
the first device sends the data in the channel occupancy period and does not send the data in the channel idle period.

17. The first device according to claim 9, wherein the processor is configured to control the transmitter to send the data at the end moment of the CCA process while in a frame based equipment operation mode.

* * * * *

UNITED STATES PATENT AND TRADEMARK OFFICE
CERTIFICATE OF CORRECTION

PATENT NO. : 10,342,031 B2
APPLICATION NO. : 15/524760
DATED : July 2, 2019
INVENTOR(S) : Da Wang et al.

Page 1 of 1

It is certified that error appears in the above-identified patent and that said Letters Patent is hereby corrected as shown below:

In the Claims

In Column 23, Line 65:
In Claim 7, delete "orthoqonal" and insert -- orthogonal --, therefor.

Signed and Sealed this
Thirty-first Day of December, 2019

Andrei Iancu
*Director of the United States Patent and Trademark Office*